Feb. 19, 1952     H. C. GODFREY     2,586,025
JET REACTION ENGINE OF THE TURBINE TYPE
Filed Jan. 5, 1946     3 Sheets-Sheet 1
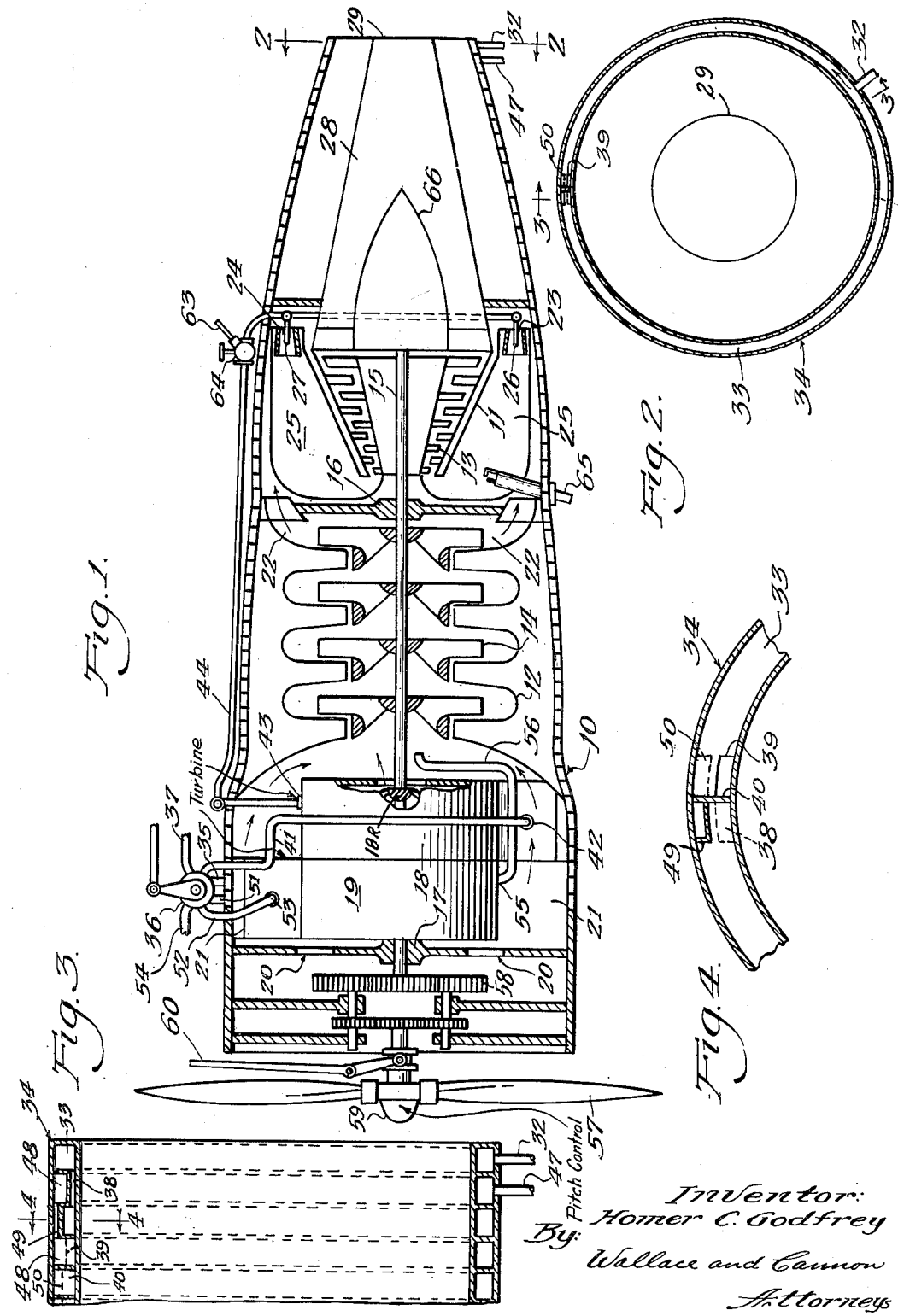

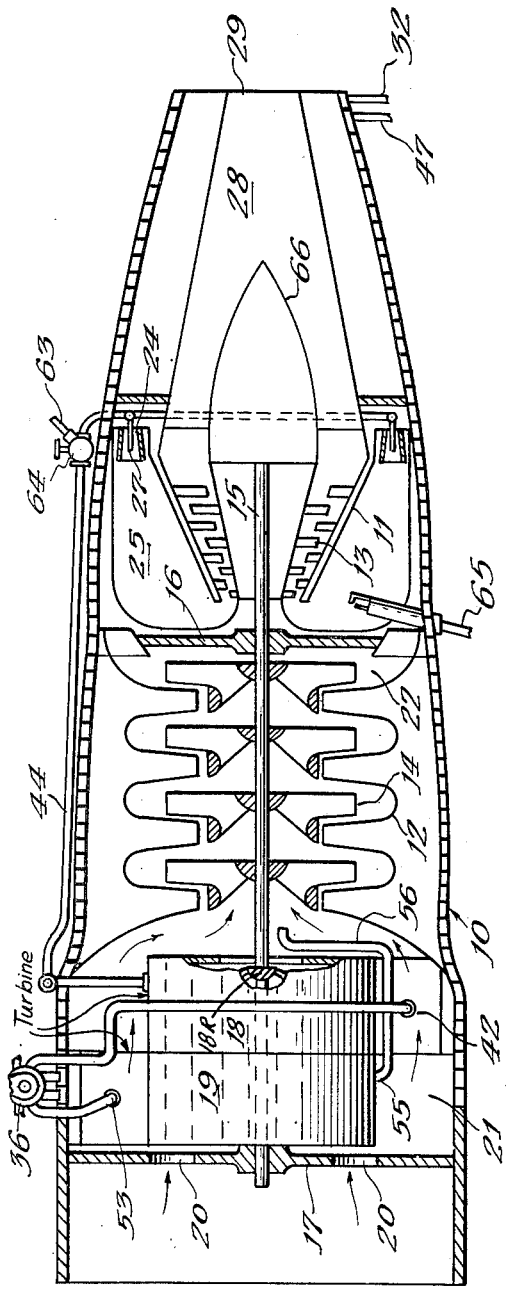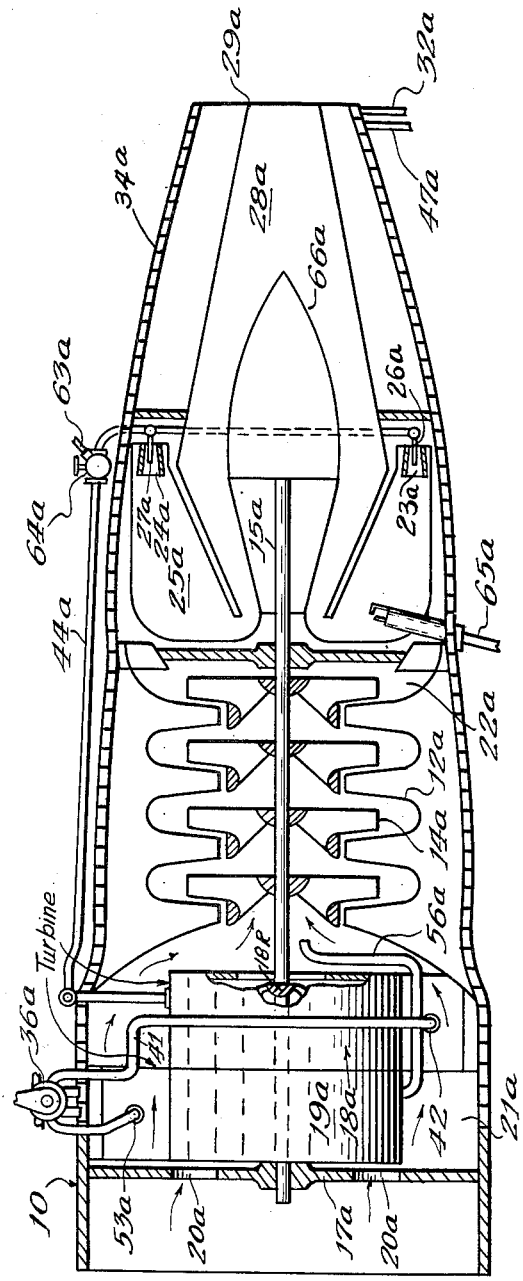

Feb. 19, 1952 H. C. GODFREY 2,586,025
JET REACTION ENGINE OF THE TURBINE TYPE
Filed Jan. 5, 1946 3 Sheets-Sheet 3
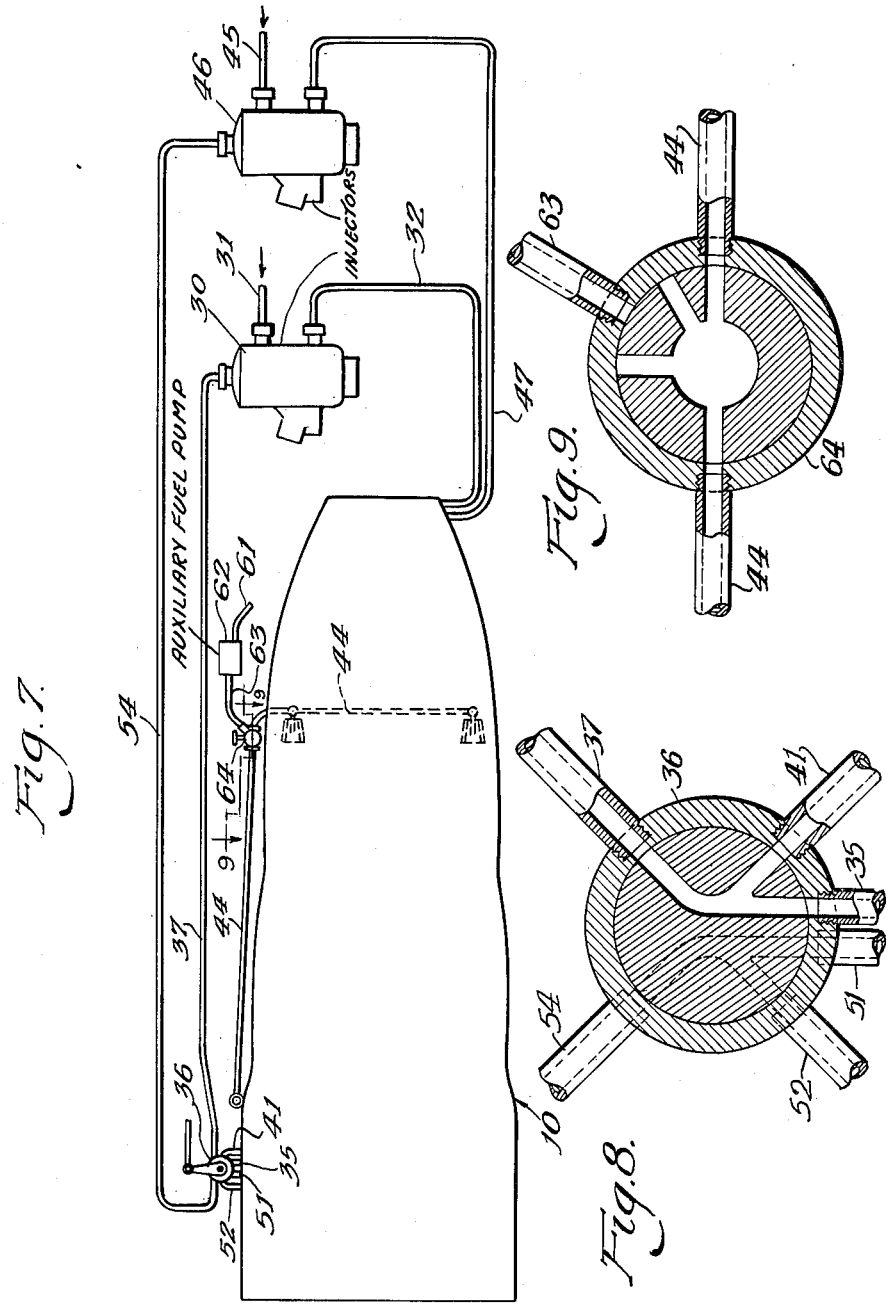
Inventor:
Homer C. Godfrey
By: Wallace and Cannon
Attorneys Patented Feb. 19, 1952

2,586,025

UNITED STATES PATENT OFFICE 2,586,025

JET REACTION ENGINE OF THE TURBINE TYPE

Homer C. Godfrey, Chicago, Ill.

Application January 5, 1946, Serial No. 639,478

4 Claims. (Cl. 60—35.6)

This invention relates to combustion engines and, more particularly, to combustion engines of the turbine driven and/or jet propulsion type.

Combustion engines of the character involved herein are, at the present time, primarily intended for the propulsion of aircraft although they are not limited thereto. Therefore, it is an object of my invention to provide a practical and efficient combustion engine which may be used to propel aircraft, among other things, while utilizing either the turbine drive or jet propulsion principle or a combination of the two.

In engines of the aforesaid character, gravity feed not being sufficient or practical, it has heretofore been the practice to employ a mechanical fuel pump driven directly or indirectly by the engine. The driving of the fuel pump accessory involves a substantial propulsion power loss in the engine. It is another object of my invention to provide a combustion engine wherein fuel is delivered under positive pressure during operation of the engine without the use of mechanical fuel pumps.

Also in engines of this character, because of the normally high temperature of the exhaust gases, the heating effect of the exhaust gases on the material forming the exhaust outlets has been a great problem and it has heretofore been necessary to use special heat resistant materials for this purpose. In this connection, it is another object of my invention to provide an engine wherein the detrimental effect of the exhaust heat on the materials forming the exhaust system is lessened by a cooling system provided therefor.

It is another object of my invention to provide a combustion engine wherein the heat absorbed in the cooling system of the engine is utilized to provide the pressure for feeding the fuel.

It is known that there is a critical altitude above which, even employing superchargers or similar devices, the earth's atmosphere will not support combustion sufficiently to propel an aircraft or the like. In order to attain altitudes higher than this critical altitude, combustion supporting material must be carried. Heretofore this involved a loss of efficiency not only because of the added weight of the combustion supporting material, but also because of the added weight of the accessories necessary to feed or supply the combustion supporting material, and the power lost in driving them.

It is an object of my invention to reduce this loss of efficiency to a minimum by providing an engine wherein the combustion supporting material does useful work, namely, aid in cooling the engine before being consumed or used in combustion.

A further object of my invention is to provide a combustion engine wherein the pressure necessary to supply or feed combustion supporting material may be derived from the heat absorbed by said material in acting as a cooling agent for said engine.

As previously pointed out, one disadvantageous feature common to combustion engines of this general character heretofore known to the art is the loss of efficiency suffered in driving or feeding the fuel. In my engine the pressure derived from the absorption of heat by the fuel while acting as a cooling agent for the engine can be used not only to feed the fuel, but also to drive an auxiliary power source such as, for example, a turbine. Hence, it is an object of my invention to provide an engine wherein the efficiency is improved because of the increased power output derived from the driving of an auxiliary power unit by the fuel being fed to the combustion chamber of the engine.

It is another object of my invention to provide a combustion engine wherein controlled amounts of steam can be effectively introduced into the combustion chamber thereof.

Also, it is another object of my invention to afford a combustion engine wherein the water, from which the steam introduced into the combustion chamber is derived, is used as a cooling agent for the engine.

It is a further object of my invention to provide a combustion engine wherein steam can be introduced under pressure into the combustion chamber thereof without the use of special additional auxiliary mechanically driven devices.

It is another object of my invention to afford a combustion engine wherein steam introduced into the combustion chamber thereof can first be used to drive an auxiliary power unit or units.

It is a further object of my invention to provide a combustion engine wherein liquid fuel and/or other liquids can be introduced into the cooling system thereof through automatic injection.

Other and further objects of the present invention will be apparent from the following description and claims, and are illustrated in the accompanying drawings which, by way of illustration, show preferred embodiments of the present invention and principles thereof and what I now consider to be the best modes in which I contemplate applying these principles. Other embodiments of the invention embodying the same or equivalent principles may be used and structural changes may be made as desired by those skilled in the art without departing from the present invention and the purview of the appended claims.

In the drawings,

Fig. 1 is a partial sectional view of an airplane engine embodying the principles of my invention, certain parts thereof being shown diagrammatically;

Fig. 2 is an elevation view taken substantially on line 2—2 of Fig. 1, with the outer peripheral edge portion thereof broken away to show the interior of the cooling jacket of the engine;

Fig. 3 is a detail sectional view taken substantially on line 3—3 of Fig. 2, and showing in enlarged section a portion of the cooling jacket of my invention;

Fig. 4 is a detail sectional view taken substantially on line 4—4 of Fig. 3;

Fig. 5 is a view similar to Fig. 1 with the special airplane engine mechanism deleted;

Fig. 6 is a view similar to Fig. 1 and shows the parts in a modified form of my engine;

Fig. 7 is a diagrammatic illustration of a portion of the fuel and comburent supply system of my engine;

Fig. 8 is a sectional illustration of one of the valves shown in Fig. 7, the view looking in the same direction as in Fig. 7; and Fig. 9 is a sectional view taken substantially along the line 9—9 in Fig. 7.

*General construction of the engine as shown in Figs. 1-5 and Fig. 7*

The engine shown in the accompanying drawings embodies a housing or casing 10 within which are positioned a main power unit or turbine 11 and a compressor 12. The rotors 13 and 14 of said turbine 11 and compressor 12, respectively, are mounted on a shaft 15 to rotate therewith and which shaft is rotatably mounted in bearings 16 and 17.

Forwardly of the compressor 12 are mounted auxiliary power units or turbines 18 and 19, the rotors of which can either be mounted on or geared to the shaft 15, depending on the relative speeds desired in any specific installation between the rotors and the shaft 15, but which, in the construction shown in Fig. 1, are mounted on the shaft 15, as shown at 18R.

Forwardly of the auxiliary turbines 18 and 19 are openings 20, and around auxiliary turbines 18 and 19 is a chamber or intake 21 so arranged that air may enter openings 20 and pass through the chamber 21 to enter the compressor 12. To the rear of the compressor 12 is an outlet chamber 22 through which, when my engine is in operation, air passes under pressure from the compressor 12 on through openings 23 and 24 into the combustion chamber 25 where it mixes with and supports the combustion of fuel such as, for example, gasoline or oil which enters the combustion chamber from jets 26 and 27. The combustion effluent which results from the combustion of the mixture within the combustion chamber forms a motive fluid or working fluid which is exhausted therefrom and passes through the turbine 11, rotating the rotor 13 thereof, and passes on into the exhaust pipe or tail pipe 28 through which it is exhausted through the rear opening 29 thereof to the atmosphere.

The fuel supply for my engine is carried in a suitable container such as a tank (not shown) and is introduced into my engine through an automatic injector 30, as will be more fully set forth hereinafter. The fuel, which can be any practical fuel such as, for example, oil, kerosene or gasoline, flows from the tank through a pipe 31 (Fig. 7), the automatic injector 30, and a pipe 32 from which it enters the lower rear portion of a channel 33 of a coolant chamber or coolant jacket 34 (best seen in Fig. 3) which forms a part of the housing or casing 10. The automatic injector 30 is shown only generally in Fig. 7 because the principle by which these devices work is well known to those skilled in the art, and inasmuch as any one of several well-known injectors can be used to feed my engine, the specific internal construction of the injector 30 forms no part of my invention. The fuel, after entering the channel 33, passes completely therethrough and exits from the front top portion of the coolant jacket 34 through an outlet pipe 35 and a valve 36 and a portion of it is finally automatically injected under pressure into the combustion chamber 25 after first passing through and driving auxiliary turbine 18, as will be more fully described hereinafter, and another portion of it circulates back to the lower rear portion of the channel 33 through a pipe 37, the injector 30, and the pipe 32. In passing through the injector 30, the fuel or fuel vapor picks up additional fuel from the fuel line 31 for injection into the coolant jacket 34 in a manner common to automatic injectors, and which will be understood by those skilled in the art.

During operation of the engine that portion of the housing 10 around the combustion chamber 25 and exhaust section 28 is subjected to extreme heat which heretofore has presented a problem in providing the metal or other material capable of satisfactorily withstanding the heat. My invention reduces this problem to a considerable extent in that the housing 10 of my engine and especially those parts surrounding the combustion chamber 25 and the exhaust pipe 28 are cooled considerably by my cooling system.

The channel 33 in the cooling jacket 34, as best seen in Figs. 2, 3 and 4, is made up of a series of hollow rings or circular channels interconnected by cross channels or conduits 38 and 39. Conduits 38 and 39 alternately connect adjacent pairs of the circular channels as best seen in Fig. 4, and a baffle 40 extends longitudinally of the channel 33 and divides the upper portion of separate rings thereof (with the exception of the most rearward ring) at a point midway between the openings of the conduits 38 and 39 so that in order for fuel to pass between conduits 38 and 39 in any one ring-shaped channel, it is necessary for the fuel to first pass completely around the channel ring. Hence it will be noted that when fuel flows into the bottom of the most rearward ring of the channel 33, in order for it to escape therefrom the liquid and/or vapor must pass upwardly (either to the left or right—Fig. 2) to the opening of conduit 38. From the first ring the liquid and/or vapor passes through the conduit 38 into the second ring of channel and, because of the baffle 40, must pass around the ring in a counterclockwise direction (Figs. 2 and 4) to exist through the passageway 39 into the third ring of the channel 33. In the third ring of the channel 33 the flow of fuel is clockwise from the passageway 39 to the passageway 38 because of the baffle wall 40, and this alternate clockwise and counterclockwise flow of fuel through the separate channel rings is repeated throughout the entire length of the channel 33. Thus it will be seen that in passing through the channel 33 from the inlet pipe 32 at the lower rear portion of my engine to the outlet pipe 35 at the upper front portion of my engine, the fuel absorbs heat throughout the entire length of the coolant jacket 34.

When my engine is operating, the oil or other fuel flows through the pipe 32 into the channel 33 where it acts as a cooling agent and where it is vaporized by the heat absorbed. The pressure created by the heating and vaporization of the fuel causes it to pass through the outlet pipe 35 into a valve 36, which is controllable by the operator, and from which the fuel flows through a pipe 41 into an inlet 42 of the turbine 18. The fuel vapor passes through the turbine 19 and drives the rotor thereof and then passes out the outlet 43 of the turbine 18 through the fuel line 44 and through the jets or nozzles 26 and 27 into the combustion chamber 25. The valve 36, shown in general in the drawings may be any one of several commonly known multi-port valves readily available on the market as will be appreciated by those skilled in the art. It will be understood that if desired, other control valves can be provided to provide the operator with further control over the flow of fuel.

It has been found that the introduction of controlled amounts of steam into the combustion chamber of an engine wherein hydro-carbons are burned gives better combustion and, therefore, more useful heat. Therefore, in my invention I have provided a novel means for introducing steam or water vapor into the combustion chamber in controlled amounts. In a manner similar to that hereinbefore set forth with respect to the fuel, water is carried in a tank or other suitable container (not shown) and flows from the tank through a pipe or feed line 45, an automatic injector 46, and a pipe 47 into a channel 48 of the coolant jacket 34. Like the fuel in channel 33 the water enters the most rearwardly positioned ring of the channel 48 at the bottom thereof and steam and water flow upwardly and exit through a cross channel or conduit 49 into the second ring of the channel 48. In the second ring of the channel 48 the water and steam are prevented from flowing clockwise (Fig. 3) because of the baffle wall 40 and, therefore, it flows in a counterclockwise direction around through the ring and exits through the cross-channel or conduit 50 into the third ring wherein it flows in a clockwise direction to exit through the conduit 49 into the fourth ring and so on throughout the length of the channel 48, from which it exits from the top portion of the most forwardly positioned ring thereof through a pipe 51. Like the fuel in channel 33, the water acts as a cooling agent and is heated and vaporized by the heat absorbed. The pressure created by the vaporization and heating of the water forces the steam through the pipe 51 and the control valve 36 from which a portion of it flows through the pipe 52 into the inlet 53 of the auxiliary turbine 19 which is similar to the turbine 18, and another portion of it flows through a pipe 54, the injector 46 and the line 47 back to the lower rear portion of the channel 48. In flowing through the injector 46 the steam picks up additional water from the pipe 45 and thus injects it into the coolant jacket 34. The steam which flows through the turbine 19 drives the rotor thereof and flows out the outlet or exhaust 55 of the turbine 19 and through a pipe or nozzle 56 into the air intake chamber 21 of the compressor 12 where it mixes with the air and passes therewith into the combustion chamber 25.

In the propulsion of surface vehicles, surface vessels or aircraft flying below the previously mentioned critical altitude it will usually be desirable to introduce steam as hereinbefore described, but I do not limit myself to the use thereof because, as previously mentioned, in some instances it may be desirable to use another comburent, and this may readily be accomplished by using a suitable comburent, such as, for example, liquid oxygen, in a manner similar to that previously described with respect to water and steam. Also my invention is not limited to the use of only two cooling agents because within the scope of my invention, three or more channels could be used in the coolant jacket 34 and each channel used for the same or different cooling agents such as fuel, steam and a comburent.

The embodiment of my invention shown in Fig. 1 is adapted for the propulsion of aircraft and embodies a variable pitch propeller 57 driven by the shaft 15 through suitable reduction gearing 58. The pitch of the propeller 57 is controlled by any suitable known mechanism 59 controlled by the operator through suitable controls 60, the mechanism 59 and the controls 60 being indicated generally in Fig. 1.

As will now be appreciated, my engine is adapted to feed fuel automatically through the coolant jacket 34 only after the engine is warmed up. Therefore, it is necessary to provide an auxiliary fuel feeding means for starting the engine. For this purpose I use a fuel line 61 (Fig. 7) which leads from the fuel tank (not shown) to an auxiliary fuel pumping device 62 which is only indicated generally in Fig. 7 because the particular type of fuel pumping device used is not important to my invention and can be any one of several types of devices such as, for example, an electrically driven mechanical pump or a hand pump. From the fuel pumping device 62 fuel can flow through a fuel line 63, a valve 64 and then into the fuel line 44 whence it flows through the jets 26 and 27 into the combustion chamber 25. A spark plug 65 or other suitable ignition device is provided in the ignition chamber 25 for starting combustion. The valve 64, which is of a type commonly known to those skilled in the art and is readily available on the market, is a two-way valve which can be selectively adjusted to "normal" position to permit flow from the turbine 18 through the entire length of the line 44 and out the jets 26 and 27, or to "auxiliary" position to permit flow from the line 63 into the valve 64 and through the rear portion of the line 44 and out the jets 26 and 27, and is of such type that when it is turned into selective position to permit normal flow from the turbine 18 the line 63 is closed off and when it is turned to permit auxiliary flow from the line 63 that portion of the line 44 leading forwardly from the valve 64 is closed off.

*Résumé of the operation of the engine shown in Figs. 1–5 and Fig. 7*

In starting the engine, the drive shaft 15 and the rotor 14 of the compressor 12 are rotated by an auxiliary starter (not shown) but which can be any one of several types now commonly known to the art, such as, for example, an inertia starter adapted to be connected to the shaft 15 through suitable connections during the starting operation and removed therefrom after the engine has started. The auxiliary priming means is used to provide the initial flow of fuel, and the spark plug 65 or other suitable ignition mechanism is used to provide the initial ignition as previously described. After the engine has started and has warmed up, the valve 64 is turned to normal operating position, the auxiliary priming unit is turned off or disconnected, and normal operation proceeds as follows:

The fuel flows from the fuel tank through the feed pipe 31, the injector 30, and the pipe 32 into chamber 33 of the coolant jacket 34, where it is vaporized and heated causing it to flow through the pipe 35 and the control valve 36 as controlled by the operator into the inlet 42 of the auxiliary turbine 18. The fuel flows through the turbine 18 driving the rotor thereof and exhausts through the outlet 43 of the turbine 18 into the fuel line 44 and is injected through the nozzles 26 and 27 into the combustion chamber 25.

Water flows from the supply tank through the feed line 45, the injector 46 and through the feed line 47 into the chamber 48 of the coolant jacket 34 where it is heated and vaporized and flows under pressure through the pipe 51, the control valve 36, and the pipe 52 into the inlet 53 of the turbine 19. The steam or water vapor then passes through the turbine 19, driving the rotor thereof, and is exhausted through the outlet 55 and the pipe or nozzle 56 into the intake chamber 21 where it is mixed with air entering through openings 20. The air and water vapor mixture passes through the compressor 12 where it is pressurized and from which it passes through the outlet chamber 22 and the openings 23 and 24 into the combustion chamber 25 where it mixes with the fuel introduced through the nozzles or jets 26 and 27.

The air-steam-fuel mixture is burned in the combustion chamber 25 is a continuous combustion and the combustion effluent or working fluid passes through the turbine 11, driving the rotor 13 thereof, and thereby turns or drives the drive shaft 15 on which the rotor is mounted to turn therewith. The rotation of the shaft 15 drives the propeller 57 through the reduction gearing 58 and thereby provides the propeller propulsion for my engine.

The combustion effluent or working fluid, after passing through the turbine 11 passes through the exhaust pipe 28 around a cap 66 mounted therein, and is exhausted through the opening 29 to the atmosphere. The cap 66 is so shaped and so positioned in the exhaust pipe 28, and the exhaust pipe 28 is so tapered, that the working fluid is exhausted through the opening 29 at a relatively high velocity so as to give a maximum jet propulsion effect.

Thus it will be seen that my engine is a novel combination turbine drive-jet propulsion engine wherein the combustion products form a motive fluid or working fluid, the force of which is utilized to cause a jet-propulsion and drive a main turbine, while the materials that enter into the combustion act as cooling agents for the engine and, while being automatically injected into the engine, drive auxiliary turbines which are coupled with the exhaust driven turbine and thereby add to the turbine drive of the engine.

*Construction and operation of the modified engine shown in Fig. 6*

The general construction of the engine shown in Fig. 6 is similar to that shown in Figs. 1–5, inclusive, the principal difference being that no exhaust turbine 11 is used, the propulsion effect derived from the exhaust gases being entirely of a jet nature. Structure shown in Fig. 6 which is similar to that shown in Figs. 1 to 5, inclusive, is indicated by like reference characters with the suffix "a" added thereto.

Starting of the engine shown in Fig. 6 is similar to that previously described for the engine shown in Figs. 1 to 5, inclusive, and it is not deemed necessary to repeat the description thereof.

After the engine has warmed up the fuel which enters the coolant jacket 34a through the fuel line 32a is heated and vaporized and passes under pressure through the control valve 36a, the turbine 18a, the fuel line 44a and nozzles 26a and 27a from which it is injected into the combustion chamber 25a.

Water enters the coolant jacket 34a through the feed line 47a and is heated and vaporized therein. The steam or water vapor passes under pressure from the coolant jacket 34a through the control valve 36a, and the turbine 19a, from which it is exhausted through the pipe 56a into the intake chamber 21a of the compressor 12a. In the chamber 21a, the water vapor or steam is mixed with air which enters through the openings 20a, and the mixture of water vapor and air passes through the compressor 12a where it is compressed and then passes through the outlet chamber 22a, through the openings 23a and 24a into the combustion chamber 25a where it mixes with the fuel and enters into combustion therewith.

The continuous combustion which takes place within the combustion chamber 25a provides a continuous source of combustion effluent or working fluid which is exhausted around the cap 66a, through the tapered exhaust pipe 28a and out the exhaust opening 29a at a relatively high velocity to provide a jet propulsion force.

The passage of the fuel through turbine 18a and the passage of the steam through turbine 19a drives the shaft 15a on which the turbines are shown mounted in Fig. 6, but to which, if so desired, they may be geared. The rotation of the shaft 15a drives the rotor 14a of the compressor 12a causing it to compress the air and steam vapor taken in through the intake channel 21a. However, the energy used to drive the compressor 12a is only a fractional part of the energy derived by the shaft 15a from the turbines 18a and 19a and the remaining energy may be utilized to provide propulsion force in addition to that derived from the jet effect of the exhaust gases, as, for example, by suitably gearing a propulsion means (not shown) such as wheels or a propeller to the shaft 15a in a manner similar to that shown in Fig. 1.

It will be understood that although I have described my engine in a manner primarily intended to propel an aircraft that I do not intend to be limited thereto, and that those skilled in the art can, by making changes which do not affect my invention, adapt my engine to propel other vehicles such as automobiles or water craft.

It will be noted that I have provided an internal combustion engine embodying a novel and practical automatic injection system.

Further, it will be noted that I have provided an internal combustion engine having jet propulsion features and embodying a novel and practical coolant system.

Also it will be noted that I have provided an internal combustion engine embodying a novel and practical auxiliary power source which will add appreciably to the over-all efficiency of the engine.

Also it will be noted that the present invention accomplishes its intended objects, some of which have been specifically referred to hereinbefore and others of which will be apparent from the foregoing description taken in conjunction with the accompanying drawings.

While I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A propulsion unit comprising a housing, a combustion chamber within said housing, an air compressor positioned within said housing, said housing having passageways to permit the entrance of air to said compressor and having passageways between said compressor and said combustion chamber to permit the passage of air from said compressor to said combustion chamber, a drive shaft rotatably mounted in said housing and drivingly connected to said compressor, means for exhausting combustion effluent from said combustion chamber, a turbine drivingly connected to said drive shaft and positioned in said exhausting means in position to be driven by the passage of combustion effluent from said combustion chamber through said exhausting means, a second turbine positioned within said housing and drivingly connected to said drive shaft, a third turbine positioned within said housing and drivingly connected to said drive shaft, cooling means adapted to use liquid as the cooling medium, means for feeding fuel and a comburent into said cooling means, means including said second turbine providing passageways for transferring fuel from said cooling means to said combustion chamber, said second turbine being disposed in position to be driven by such passage of fuel from said cooling means to said combustion chamber, means including said third turbine providing passageways for transferring a comburent from said cooling means to said compressor, said third turbine being disposed in position to be driven by such passage of comburent from said cooling means to said compressor, means for controlling the flow of fuel to said combustion chamber, and means for controlling the flow of comburent to said compressor.

2. The propulsion unit defined in claim 1 and in which said means for feeding fuel and a comburent includes an automatic injector.

3. The propulsion unit defined in claim 1 and in which said cooling means comprises a coolant jacket surrounding said combustion chamber and said exhausting means and having a channel therein adapted for the passage of fuel therethrough and a separate channel therein adapted for the passage of a comburent therethrough.

4. The propulsion unit defined in claim 1 and in which said cooling means comprises a coolant jacket having a plurality of interconnected hollow rings adapted for the passage of fuel therethrough, and a plurality of interconnected hollow rings adapted for the passage of a comburent therethrough, each of said pluralities of hollow rings having baffles therein to cause the flow therethrough in adjacent rings to be alternately clockwise and counterclockwise, and in which said means for feeding fuel and a comburent includes an injector for injecting fuel into said coolant jacket and an injector for injecting a comburent into said coolant jacket.

HOMER C. GODFREY.

REFERENCES CITED

The following references are of record in the file of this patent:

UNITED STATES PATENTS

| Number | Name | Date |
| --- | --- | --- |
| 1,210,300 | Gallagher | Dec. 26, 1916 |
| 2,298,625 | Larrecq | Oct. 13, 1942 |
| 2,332,866 | Müller | Oct. 26, 1943 |
| 2,398,654 | Lubbock et al. | Apr. 16, 1946 |
| 2,430,398 | Heppner | Nov. 4, 1947 |
| 2,439,273 | Silvester | Apr. 6, 1948 |
| 2,483,045 | Harby | Sept. 27, 1949 |

FOREIGN PATENTS

| Number | Country | Date |
| --- | --- | --- |
| 11,277 | Great Britain | Sept. 22, 1885 |
| 459,924 | Great Britain | Jan. 18, 1937 |
| 276,911 | Italy | Aug. 22, 1930 |

OTHER REFERENCES

"Astronautics," No. 34, June 1936, pp. 9 and 11.